United States Patent

[11] 3,553,445

[72] Inventor Jorge Hernandez
Larkspur, Calif.

[21] Appl. No. 573,953
[22] Filed Aug. 22, 1966
[45] Patented Jan. 5, 1971
[73] Assignee SCM Corporation

[54] MULTICIPHER ENTRY
11 Claims, 14 Drawing Figs.

[52] U.S. Cl. .......... 235/156, 235/160, 340/172.5
[51] Int. Cl. .......... G06f 7/38, G06f 3/00
[50] Field of Search .......... 235/156, 168, 158—166, 60.23; 340/172.5

[56] References Cited

UNITED STATES PATENTS

| | | | |
|---|---|---|---|
| 3,193,669 | 7/1965 | Voltin | 235/159X |
| 3,374,468 | 3/1968 | Muir | 235/156X |
| 3,375,356 | 3/1968 | Scuitto et al. | 235/160 |
| 3,405,392 | 10/1968 | Milne et al. | 340/172.5 |

*Primary Examiner*—Malcolm A. Morrison
*Assistant Examiner*—Charles E. Atkinson
*Attorney*—Armand G. Guibert

ABSTRACT: A data entry device with provision for automatically spacing the entry of digits is disclosed. In particular, an improved ten-key keyboard provides for entry of digits with automatic provision of a desired spacing between groups of digits as a result of operating a special key.

INVENTOR
JORGE HERNANDEZ
BY Armand G. Guibert

Fig. 6. Transfer routine and Enter Digit routine

MULTICIPHER ENTRY

The invention relates generally to data entry devices for computing machines or memory devices. In particular it relates to ten-key keyboards for entry of digital data into electronic calculators.

Use of full-keyboard calculators is well known in correlation calculations where it is desired to accumulate the squares and also the cross products of successive readings of two distinct variables. The technique employed generally depends on setting values of each variable on opposite sides of the keyboard, the separation by several orders preventing the merging of the results. The performance of the same calculations on a machine with a ten-key keyboard is more difficult, because the separation between the values must be achieved by manually "pumping" in the desired number of zeros (spaces), with attendant possibility of errors when this pumping is performed repetitively for long series of calculations.

It is therefore an object of the invention to provide an improved ten-key keyboard for entry of digits with automatic provision of a desired spacing between groups of digits.

Another object is to provide for entry of digits with automatic provision of a desired spacing between groups of digits as a result of operating a special key.

Yet another object is to provide for entry of digits with automatic spacing between digits under control of a dual function key.

Still another object is to provide for entry of digits with automatic spacing conditioned by a decimal point key, but effected by operation of a succeeding digit key, whether zero or nonzero.

The invention resides in providing a switch which permits normal operation when in one position, but when in the other position modifies operation such that depression of a decimal point key conditions the machine for entry of the next digit into a position six orders to the right of the one entered last instead of one order to the right as is normal. This invention is generally applicable to an electronic calculator or memory device having a keyboard and addressing means for entering data selectively into desired areas of the memory. It has been applied, however, specifically to the electronic digital calculator disclosed in the copending application Ser. No. 342,881, filed Feb. 6, 1964, to Stanley Frankel, and entitled "Calculating Machine." Accordingly, though the following description of the invention is based on its embodiment in the calculator disclosed in the above-referenced application, which calculator has a delay-line memory, those skilled in the computer art will recognize its ready extension to devices having magnetic drum memories, core memories, etc.

Further, to keep the explanation short, only those elements of the basic calculator pertinent to the present invention will be described in detail, the necessary remainder merely being sketched in to the extent sufficient for ready understanding of the overall concept by those reasonably skilled in computer design.

The description is thus by way of example only and is made with reference to the accompanying drawing, in which.

Figure 7:
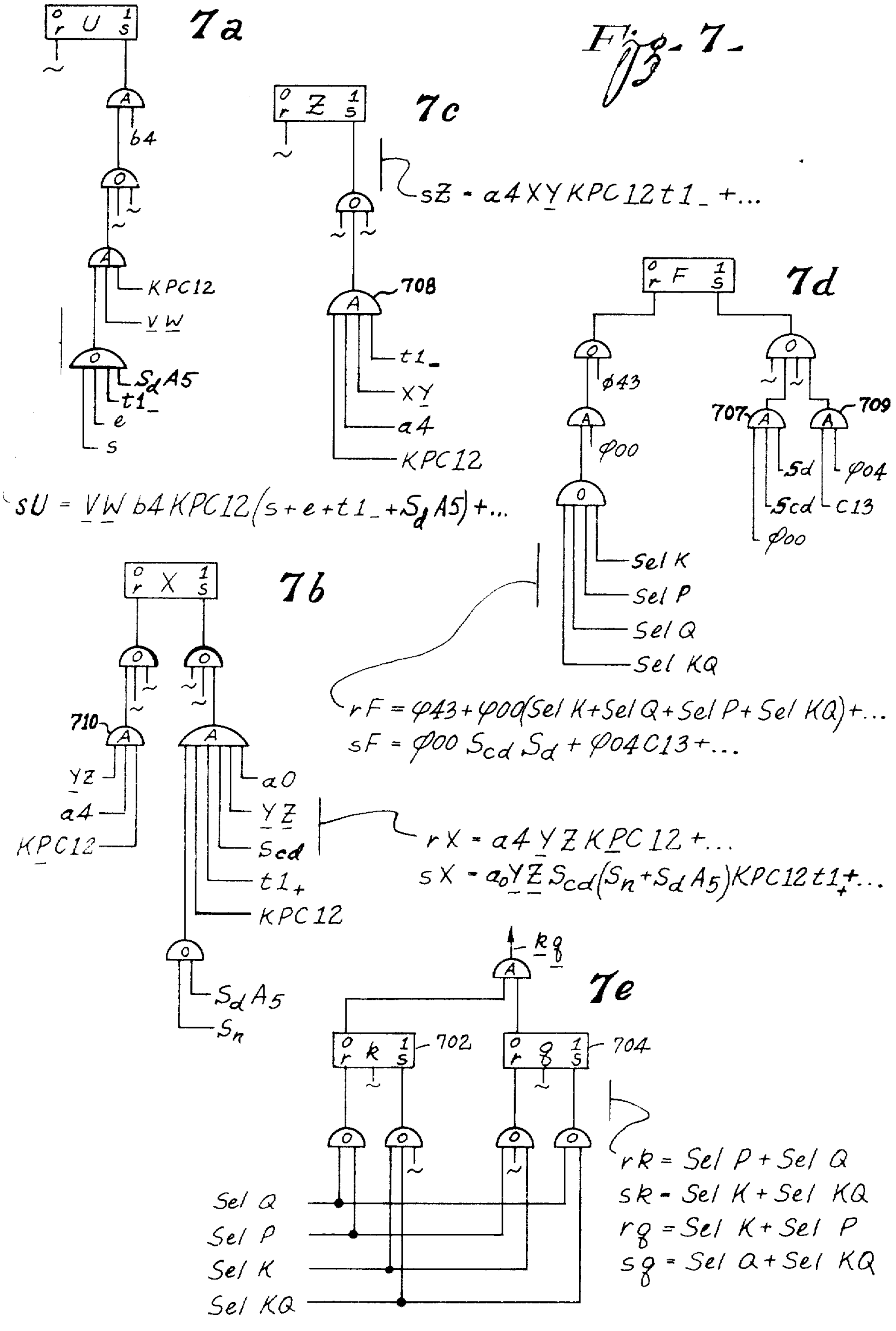
Figure 8:
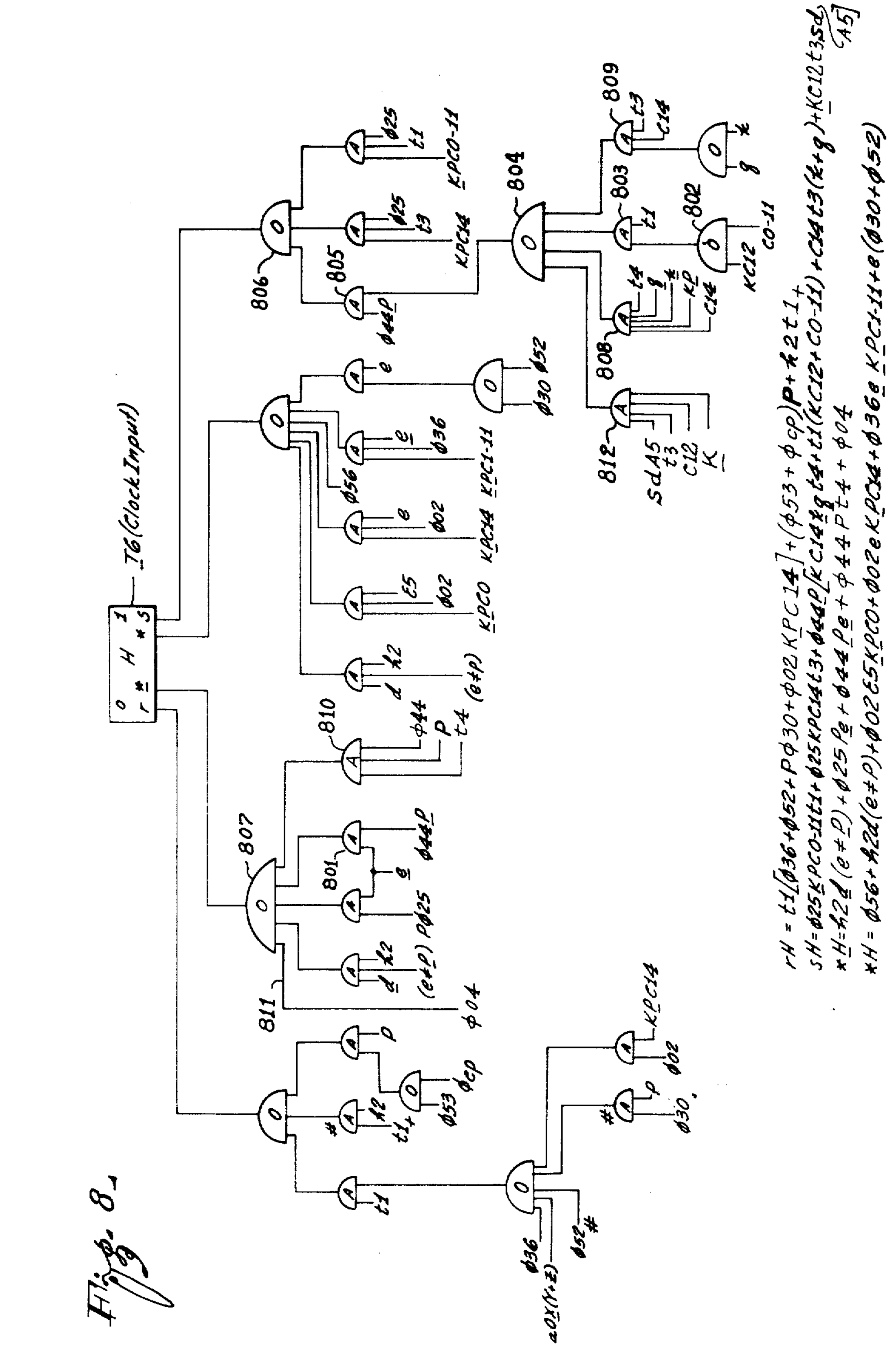
Figure 9:
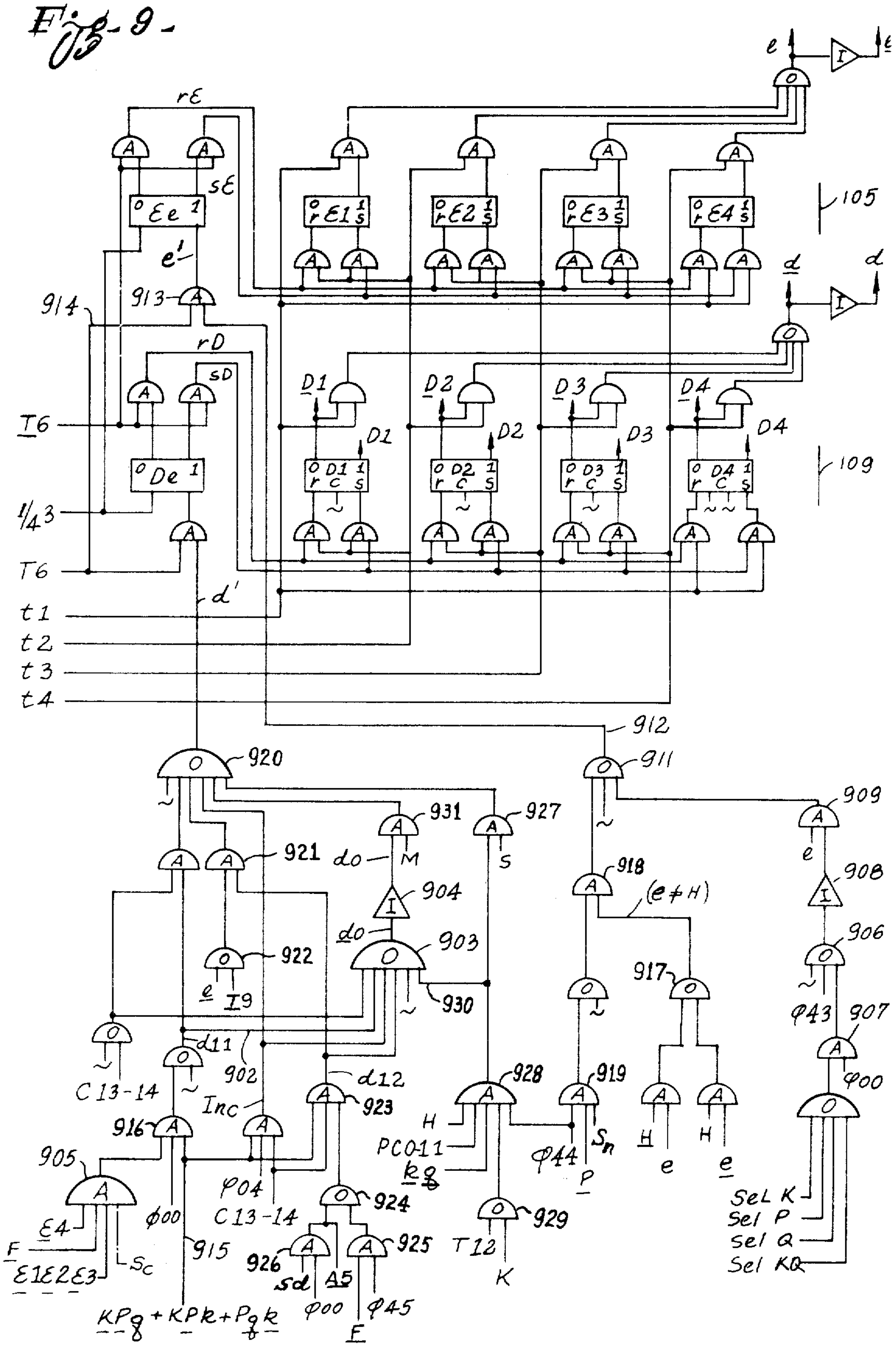
Figure 10:
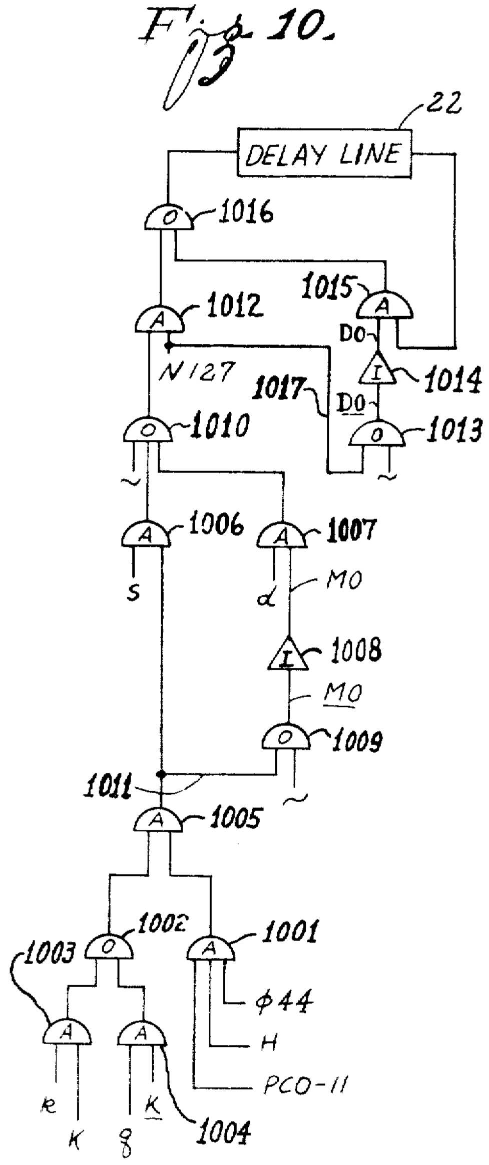

FIGS. 7*a* to 7*c* are block diagrams of the phase defining flip-flops U, X, and Z and their associated controlling circuitry;

FIG. 7*d* is a block diagram of the decimal point fixation flip-flop F and its associated control circuitry, FIG. 7*e* is a block diagram of the register-defining *k* and *q* flip-flops and their associated circuitry, FIG. 8 is a block diagram of the "Carry-detecting" H flip-flop and its associated control circuitry;

FIG. 9 is a block diagram of the E1—E4 and D1—D4 flip-flops, comprising a counting register and a buffer register, respectively, and their associated control circuitry;

FIG. 10 is a block diagram of the memory and associated circuitry for control of digit entry.

Before proceeding with the description, a few remarks should be made concerning symbols used therein, as well as in the above-mentioned FIGS. First, the logical operator "NOT" is indicated by an underline, e.g., if U = 1, then $\underline{U}$ = 0 and vice versa. Asynchronous setting of a binary to the "one" state is identified by the prefix "s" and resetting by the prefix "r." In addition, the prefix "*" identifies the synchronous resetting of a binary, the specific clock being one which marks the end of a bit period, as will be described.

GENERAL DESCRIPTION

Figure 1:
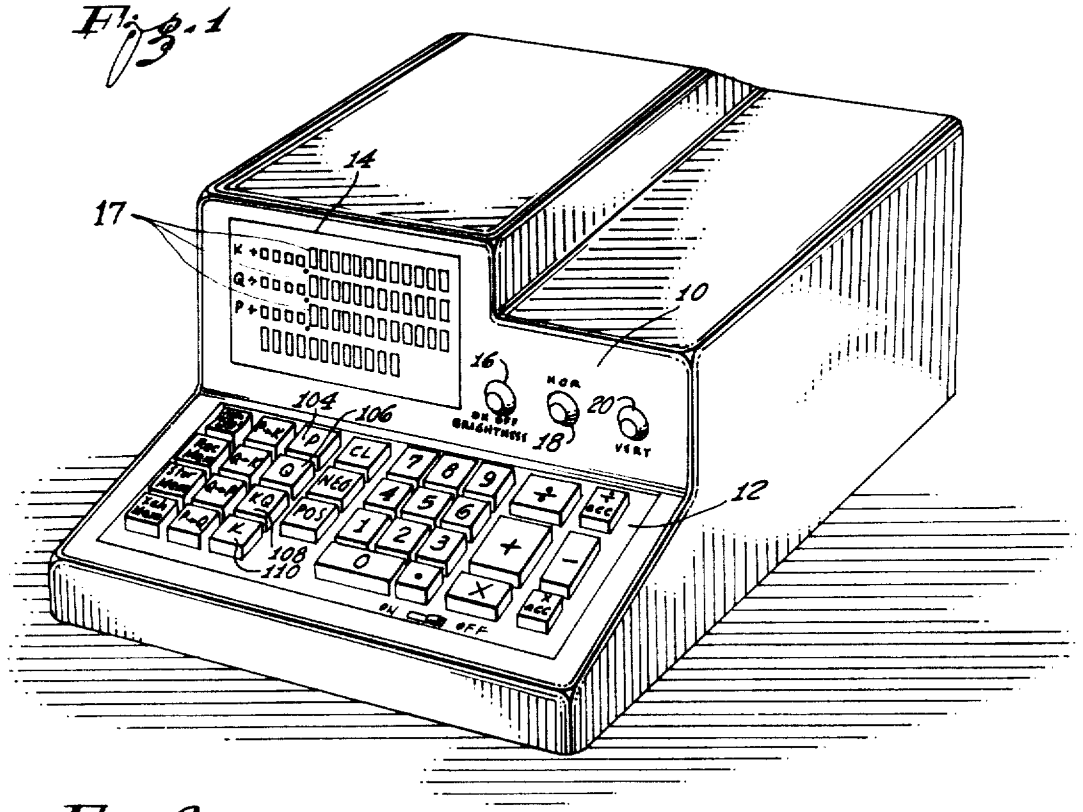
FIG. 1 is a view of the outer configuration of a desk calculator showing the keyboard according to the invention, together with display and display controls.

The electronic digital calculator in question is a four-species calculator (see FIG. 1) having a cyclic memory with three working registers identified as K, Q, and P, the first two having 12 decimal digit capacity, and the third having double this capacity, i.e., 24 decimal digit capacity. Factors and results are stored in these three registers, the information stored including not only the digits, but also signs and decimal point information. All this information is displayed continuously on the screen 14 of a cathode ray tube, including signs and decimal points.

Floating point arithmetic is used in the calculator, and as a result, the character in the leftmost digit display position 17 (FIG. 1) of each register (the first position just to the right of the half-size zeros, termed "permanent" zeros for reasons to be described later) is the most significant digit of the information stored in that register. Furthermore, internally each register has actually an extra three positions to the left of the most significant digit storage position, these positions being for storage of the sign and decimal point information mentioned above.

Figure 5:
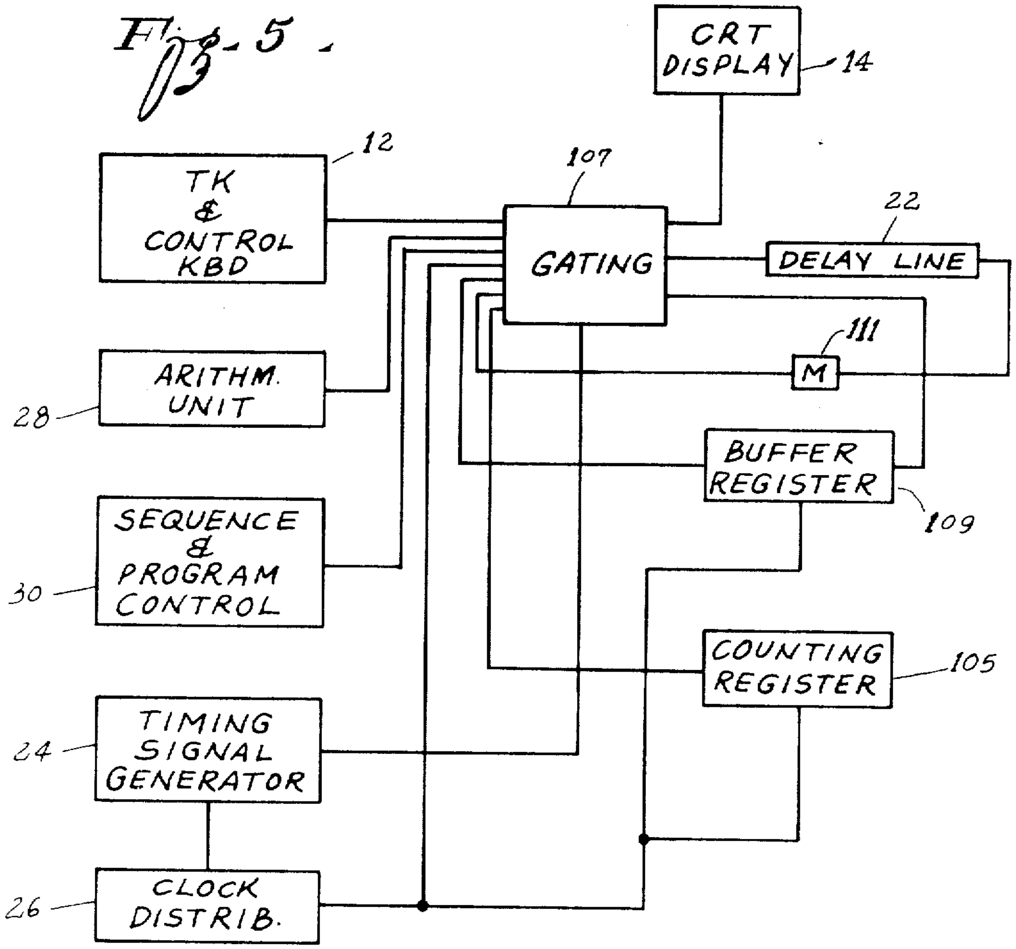
FIG. 5 is a block diagram of the calculator elements.

A block diagram of the system is shown in FIG. 5 from which it is seen that the essential components are a control keyboard 12, a display unit 14, a memory unit including a delay line 22, a flip-flop 111 and a buffer register 109; a timing signal generator 24, a clock distributor 26, an arithmetic unit 28, a four-bit counting register 105 and a sequence and program control unit 30, together with appropriate gating 107. Units 28 and 30 have a number of auxiliary flip-flops in common, these being used both for control purposes and in arithmetic operations for reasons of economy. The four-bit counter and register 105 would normally be considered part of sequence and program controls 30, but is here shown separately because it is pertinent to the invention to be described.

Figure 2:
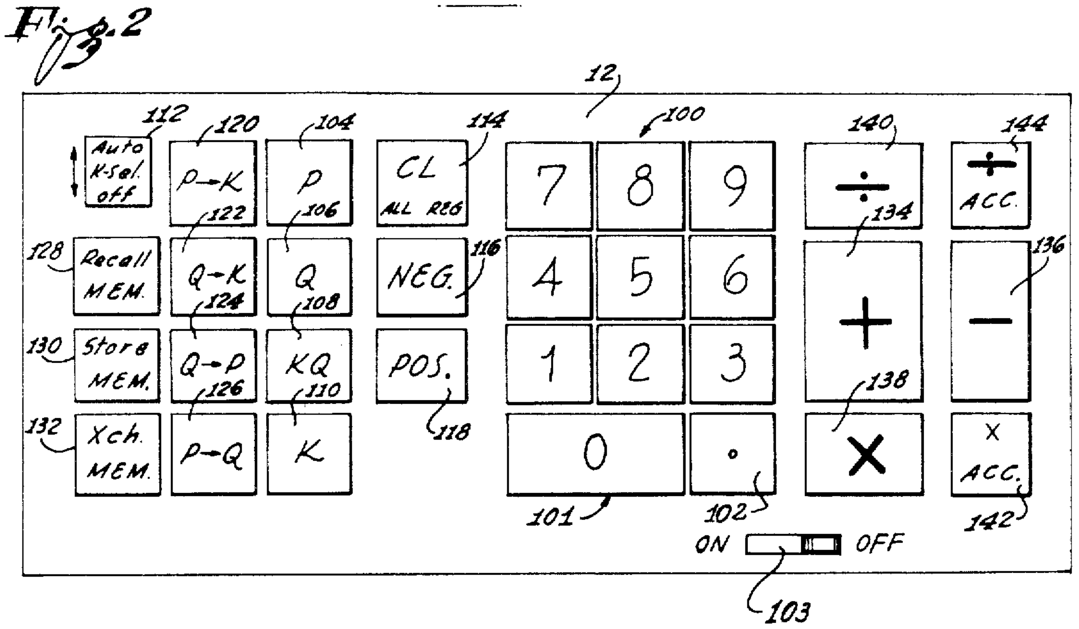
FIG. 2 is an expanded view of the keyboard of FIG. 1, showing more clearly a "Five Cipher Switch" for controlling the spacing between storage locations of successively entered digits.

The keys in control keyboard 12 which are pertinent to the present invention, include a ten-key keyboard 100 for entry of values including a zero key 101 as seen in FIG. 2, together with a decimal point key 102. Register selection keys 104, 106, 108, and 110 are also of interest. According to the invention, furthermore, a slide switch 103 is provided for conditioning the decimal point key operation so it will essentially enter five zeros in the selected register in addition to determining the location of the decimal point in the number stored in that register.

The next block for consideration is the number display. In this calculator—as mentioned above—the factors and results are displayed electrooptically on the screen 14 of a cathode ray tube, although other known methods such as electronically-controlled printers or glow-discharge character tubes could equally well be used. The technique employed is to cause generation of the rectilinear "Figure eight" pattern by appropriate deflection of the beam of the CRT, as fully detailed in the copending application. Additional means are provided to control displacement of the pattern generation in conformity with the location of the data being read out of the register. The data in the register are available serially from least significant digit to most significant digit in binary coded decimal form. Means are therefore provided to use this coded information for control of beam intensity. The coded signal controls suppression of the different parts of the FIG. eight pattern such that the desired character is obtained at the given denominational location. By proper modification, the beam is also used to indicate the location of the decimal point with respect to the characters displayed on the screen by forming a low-positioned dot between the appropriate characters. To allow for the case where the number displayed is less than unity, a set of four "permanent" zeros—distinguished from the others in that they are half-size—are always displayed to the left of the most significant digit. These four zeros are sufficient to take care of most eventualities when the decimal point is to the left of the most significant digit.

The next item for discussion, in the block diagram of FIG. 5, is the memory unit. In the calculator of this embodiment, the memory unit has a magnetostrictive delay line 22 of a length permitting it to hold a number of bits at least equal to all the bits of the three registers mentioned. The minimum bit storage requirement is determined by the fact that the delay line must store the contents of the three registers, one of them, designated P, being of double length, as mentioned earlier. The capacity of the smaller registers, designated Q and K, is 15 four-bit binary-coded decimal characters, i.e., 60 bits per register of the smaller size and 120 bits in the larger register. As described in detail in the copending application, the data in these registers are considerably interleaved, all the one weighted bits being presented first, followed by the two's, four's and finally the eight weighted bits. The sequence of presentation of data (disregarding additional registers present in the structure of the copending application) from the various registers is first the "1" bit corresponding (at least initially, but not always because of the existence of precession in the circulation) to the least significant digit of the Q register, followed by the "1" bit of the least significant digit of the P register, etc., for 12 data characters in each of the Q and P registers. This is then followed by sign information in the Q register, but the succeeding information from the P register are data of no significance whatsoever, being excess positions originating because of the doubled length of the P register, and retained only to provide simplicity of control. In similar fashion, "1" the bits of the decimal point information (two character positions) for the Q register follow, interleaved with more excess positions for the P register. After the last of the P register excess positions, there appears the "1" bit of the least significant character position of the K register. Following this, however, is the "1" bit position of the 13th character of the P register, etc., for the 12 data characters, the sign character and decimal point information (two character positions) of the K and P registers. This process is repeated, of course, for the "2," "4," and "8" bits. For each character period (memory cycle, as will be seen) there are then four bits for each Q (or K) register digit together with an equal number of bits for each P register digit, i.e., 240 bits of information (exclusive of additional storage registers— the "surrogate" registers described in the copending application).

The timing signal generator 24 (FIG. 5) is used for timing pulses set into delay line 22 and comprises a 1.1 megacycle multivibrator. Delay line 22 and its circuitry is referred to as the high-speed memory. In order to simplify presentation of the delay line data to the arithmetic unit and to the display unit, a four-bit buffer register D (109 in FIG. 5) is provided and the data in delay line 22 are highly interleaved and are caused to precess. As a result, the characters from various registers circulate through buffer register 109 serially at a much lower rate than in the high-speed delay line circulation mentioned above. their appearance in buffer register 109 comprising what is termed the low-speed memory system. In the latter, the complete characters are presented at a rate of about 2,160 per second, about 30 milliseconds being required for access to the complete main register contents of delay line 22, this access time being termed a "machine cycle." The high-speed memory and its interrelation with the low-speed memory will not be considered further here, as it is fully described in the copending application.

The 60 characters successively presented during each machine cycle of the low-speed memory must be distinguished. Each character period is defined by means of the clock distributor 26 of FIG. 5, consisting of a number of flip-flops (not shown) arranged to form a counter which counts essentially through a number corresponding to the number of bits stored (the number of flip-flops used may correspond to a higher count, but certain stages are suppressed in known fashion). The characters are also counted, as described below. All the bits stored in the delay line are recirculated in one character period, thus each bit in memory is available once in each character period and since each character period corresponds to one circulation of the data in the memory, it may also be called a "memory cycle." The four bits of a single character are entered into buffer register 109 during each character period and in the next period are returned to inactive status, i.e., returned to mere circulation in the delay line 22.

The clock distributor 26 comprises 13 flip-flops (not shown) T0, T1—T12 and two flip-flops P and K (also not shown). The changes in state of these timing flip-flops are paced by the above-mentioned multivibrator 24 which produces the primary clock pulses. These flip-flops define the various parts of the period of time called a machine cycle. Each machine cycle is divided into two half-cycles by flip-flop K, which is "Off" in the first half-cycle (marked $\overline{K}$ ), and "On" in the second half-cycle (marked K). Each half-cycle is divided into 30 character periods. In each character period, one character of the number stored in one of the three registers K, Q, and P is available for manipulation. In operations, a character which becomes available in one character period may undergo some modifications as it is set into the four "D" flip-flops (FIG. 9) forming buffer register 109. The character held in buffer register 109 is then available for further manipulation in the following character period. Typically, manipulation of the character ends at that time and the character is returned to an inactive status (storage) in the high-speed memory (delay line 22) until the next machine cycle. Occasionally a character is held for additional character periods in buffer register 109.

Each character, as mentioned before, consists of four bits presented serially: First, the least significant bit, then the second and third bits, and last the most significant bit. A character may be a decimal digit, in which case the numerical value of the character is no greater than nine. A character may also be part of a decimal position indication. A decimal position indication may have any value from zero to 63, since six bits from two adjacent characters are used to provide the decimal position indication.

The digit, sign, and decimal character position of the three registers are identified by 15 C-numbers, C0, C1—C14. These are distinguished by timing flip-flops T9, T10, T11, and T12 (not shown) and are marked as follows:

| | T9 | T10 | T11 | T12 |
|---|---|---|---|---|
| C0 | 0 | 0 | 0 | 0 |
| C1 | 1 | 0 | 0 | 0 |
| C2 | 0 | 1 | 0 | 0 |
| C3 | 1 | 1 | 0 | 0 |
| C4 | 0 | 0 | 1 | 0 |
| C5 | 1 | 0 | 1 | 0 |
| C6 | 0 | 1 | 1 | 0 |
| C7 | 1 | 1 | 1 | 0 |
| C8 | 0 | 0 | 0 | 1 |
| C9 | 1 | 0 | 0 | 1 |
| C10 | 0 | 1 | 0 | 1 |
| C11 | 1 | 1 | 0 | 1 |
| C12 | 0 | 0 | 1 | 1 |
| C13 | 1 | 0 | 1 | 1 |
| C14 | 0 | 1 | 1 | 1 |

The first twelve C-numbers define digit positions and are collectively denoted C0—11. The last three C-numbers together define sign and decimal character positions and are collectively marked C12—14, and the last two, defining the decimal character positions alone, are marked C13—14. Other groups of C-numbers are denoted C1—11 and C1—12. The specific C-numbers and groups of C-numbers are used to limit the times of occurrence of particular activities in the desk calculator.

The first character period of the first half-cycle of the machine cycle is marked KPCO where C0 represents the first state of the four flip-flops: T9, T10, T11, and T12. In this first character period, the least significant digit of the Q register is entered into register 109. The second character period of the first half-cycle is marked KPCO to signal the fact that the least significant digit of the P register is entered into register 109. The third and fourth are marked KPC1 and KPC1, and identify the next least significant digits of Q and P, respectively. Similarly, the successive character periods of the second half of the machine cycle are marked KPCO, KPCO, to mark entry into register 109 of the least significant digits of the K register and the 13 from least significant digit of the P register, etc. Flip-flop P changes state after each character period and there is a change in the state of one or more of the flip-flops T9 to T12 at the time P changes from "On" to "Off." Two successive character periods, the first marked P, the second marked P, are called a "character period pair" and have a common "C-number" indicating the states of flip-flops T9 to T12.

Each character period is divided into four bit periods. Each bit period (with one exception, described in the copending application, but not pertinent here) is divided into 120 clock periods. In each bit period, a single bit of the working memory is held in a flip-flop called M (111 in FIG. 5) and is then available for manipulation before storage in buffer register 109. A bit may also be modified or made use of during any of the bit periods in each machine cycle when that bit is in an active status, i.e., stored in one of flip-flops D1—D4 of buffer register 109. Division of each character period into four bit periods (*t*1, *t*2, *t*3, and *t*4) is achieved through two flip-flops T7 and T8 (also not shown), which cycle in the Gray code pattern.

Each of the four bit periods is subdivided into four quadrants (¼ 1, ¼ 2, ¼ 3, and ¼ 4).

The quadrants are distinguished by the states of flip-flops T5 and T6 (not shown) in the binary code. (The first and second quadrants of a bit period together are designated by the subscript —, the third and fourth quadrants together by +. Thus *t*4— means (¼ 1 + ¼ 2) t4 and T1+ means (¼ 3 + ¼ 4) t1.

Each quadrant is divided into 30 clock periods by flip-flops T0, T1, T2, T3, and T4. These flip-flops form a normal binary counter (except for certain conditions described in detail in previously mentioned copending application, but not included here because these details are not germane to the present invention.

In summary, each bit period has 120 clock periods differentiated by the states of the flip-flops T0 to T6, where T0 is the least significant bit and has a position value of unity, T1 has a position value of two, and so on to T6 which has a value of 64.

Multivibrator 24 provides a primary clock pulse for timing the cycling of flip-flops T0, T1—T6. The resetting of flip-flop T6 marks the end of a bit period and provides a signal to drive the bit period flip-flops T7, T8. Similarly, resetting of flip-flop T8 marks the end of a memory cycle and serves to change the state of flip-flop P and—in turn—the resetting of P provides a clock signal (not shown) which drives the flip-flops T9, T10, T11, T12, and K. These changes are described by equations given in detail in the copending application which need not be repeated here, as such operation of flip-flop counters is well known (See for example Chapter 7 of "Arithmetic Operations in Digital Computers," R. K. Richards, Van Nostrand, 1955). The resetting of K marks the end of a full machine cycle.

The K and P flip-flops together with the C-number flip-flops and the flip-flops T0-T8 provide a plurality of signals which indicate periods of time which are of frequent occurrence in the circumstances for setting and resetting the sequence flip-flops (described below) and other expressions in the logic of the desk calculator, as will be seen.

The sequence and program control 30 of the desk calculator 10 comprises six flip-flops, U, V, W, X, Y, and Z (only those of immediate concern being shown here, see FIGS. 7*a*—*c*). The 64 possible combinations of these six flip-flops are used to control all operations of the machine in well known fashion. These flip-flops are divided into two groups, UVW and XYZ, the first three forming what is termed the *a* group and the latter three forming what is termed the *b* group. For each type of activity there is a corresponding setting of each flip-flop of the two groups. Each activity is therefore differentiated by what is termed a "phase" and the setting of the two groups of flip-flops is distinguished in ordinary binary count fashion, with the rightmost of each group being the least significant bit. Thus, each phase can be characterized by a symbol $\Phi_{ab}$ where $a$ and $b$ refer to the decimal equivalents of the values represented by the settings of the flip-flops in the pertinent group. The condition $a = b = 0$ defines the rest state $\Phi_{00}$. The rest state $\Phi_{00}$ is the one occupied by the machine whenever an operation initiated by depression of one of the keys on the keyboard has been completed, the key that started the operation has been released, and no further keys have been depressed. As evident from the above, in this phase all six flip-flops are in the reset state, i.e., $uvw$ and $xyz$ Departure from the rest state occurs only on operation of any of the control keys on the keyboard. Each key depression initiates an activity which leads, on completion, to a return to the rest state. The major activities are carried out in "routines." Each routine makes use of a series or group of phases, each phase change reversing the state of one of the six phase-indicating flip-flops (or possibly more than one when operation is synchronous). The Enter Digit (Ed.) routine, that is pertinent to the present invention, is presented in FIG. 6. As shown there, that routine comprises Φ04, Φ44, and Φ45, together with two other phases which will only be discussed briefly herein as they are not too pertinent. The events occurring in the phases Φ04, Φ44, and Φ45 will be discussed subsequently, but at this point it is of interest to note merely that Φ04 corresponds to the control flip-flop settings $uvw\ xyz$, i.e., 000 100; Φ44 corresponds to $uvw\ xyz$, or 100 100; and Φ45 corresponds to $uvw\ xyz$, or 100 101. The conditions leading to these combinations and the events they control will next be discussed in greater detail.

DATA ENTRY

Data entry and register selection are effected by means of the control keyboard 12 (FIG. 1) which contains a ten-key keyboard 100 for digit entry, including a zero entry key 101; one key 102 for decimal point entry; four keys 104, 106, 108, and 110 for register selection; and a clear key 114. Key 102 adjacent the ten-keys 100 for value entry in FIG. 2 is termed the "Decimal Point" key or, more succinctly, the "decimal" key, and is normally used to place the decimal point at the desired position within the number. According to the invention, however, the overall effect of decimal point key 102 is determined by a two-position switch 103 called the "Five-Cipher" Switch, hereafter. When switch 103 is in its OFF position, depression of decimal point key 102 causes the decimal point to be fixed in the selected register, just to the right of the last significant digit entered. On the other hand, according to the invention, when switch 103 is in the ON position, operation of decimal point key 102 not only fixes the decimal just to the right of the last significant digit, but also conditions the machine so that the next digit entered is placed six places to the right of the decimal point, as will be described. The five spaces in between are occupied by zeros.

The four Register Selection keys 104, 106, 108, and 110 are used in determining the register(s) into which a number is placed. Any one of the three registers K, Q, or P, may be chosen by depressing keys 104, 106, or 110. Further, by depressing key 108, the pair of registers, K and Q, may be chosen such that the number set in through the keyboard enters both the K and Q registers. Flip-flops 702 and 704 (FIG. 7e) designated *k* and *q*, store the keyboard selection of the register. These flip-flops follow a code as shown below.

| | | | | |
|---|---|---|---|---|
| k | 0 | 1 | 0 | 1 |
| q | 0 | 0 | 1 | 1 |
| Selected register | P | K | Q | K&Q |

The keys 104, 106, 108, and 110 not only choose the register to be entered, but also set up an "Initial Entry" condition in the desk calculator. When any one of the register selection keys is operated, the Initial Entry condition modifies the effect produced upon subsequent operation of any of the digit keys 100, 101, or the decimal point key 102. Specifically, when the Initial Entry condition exists, operation of any digit key or the decimal point key results first in clearance of the selected register and then in the activity specific to the key depressed. Other operations (arithmetics, transfer, etc.) may also produce the Initial Entry condition in the same manner. The Initial Entry condition makes it unnecessary to clear a register manually before beginning the process of setting a number into it, since clearance automatically accompanies the first depression of any of the keys 100, 101, or 102.

In a phase Φ43 occurring near the end of the "Restore P" routine (a terminal series of operations appended to many other routines, as described in the copending application) the Initial Entry condition is produced such that flip-flop F (FIG. 7d) and all of the E flip-flops, including those forming the register 105 (see FIG. 9) are reset. The resetting of the F flip-flop and the E flip-flops, E1 to E4, is also done in Φ00 on operation of any one of the register selection keys 104, 106, 108, and 110. The control of these flip-flops is shown by:

$$rF=\phi 43+\phi 00(\text{Sel. }K+\text{Sel. }Q+\text{Sel. }P+\text{Sel. }KQ)+\ldots \quad \text{(Figure 7d)}$$

$$e'=0 \text{ in } [\phi 43+\phi 00(\text{Sel. }K+\text{Sel. }Q+\text{Sel. }P+\text{Sel. }KQ)] \quad \text{(Figure 9)}$$

Figures 3, 4:
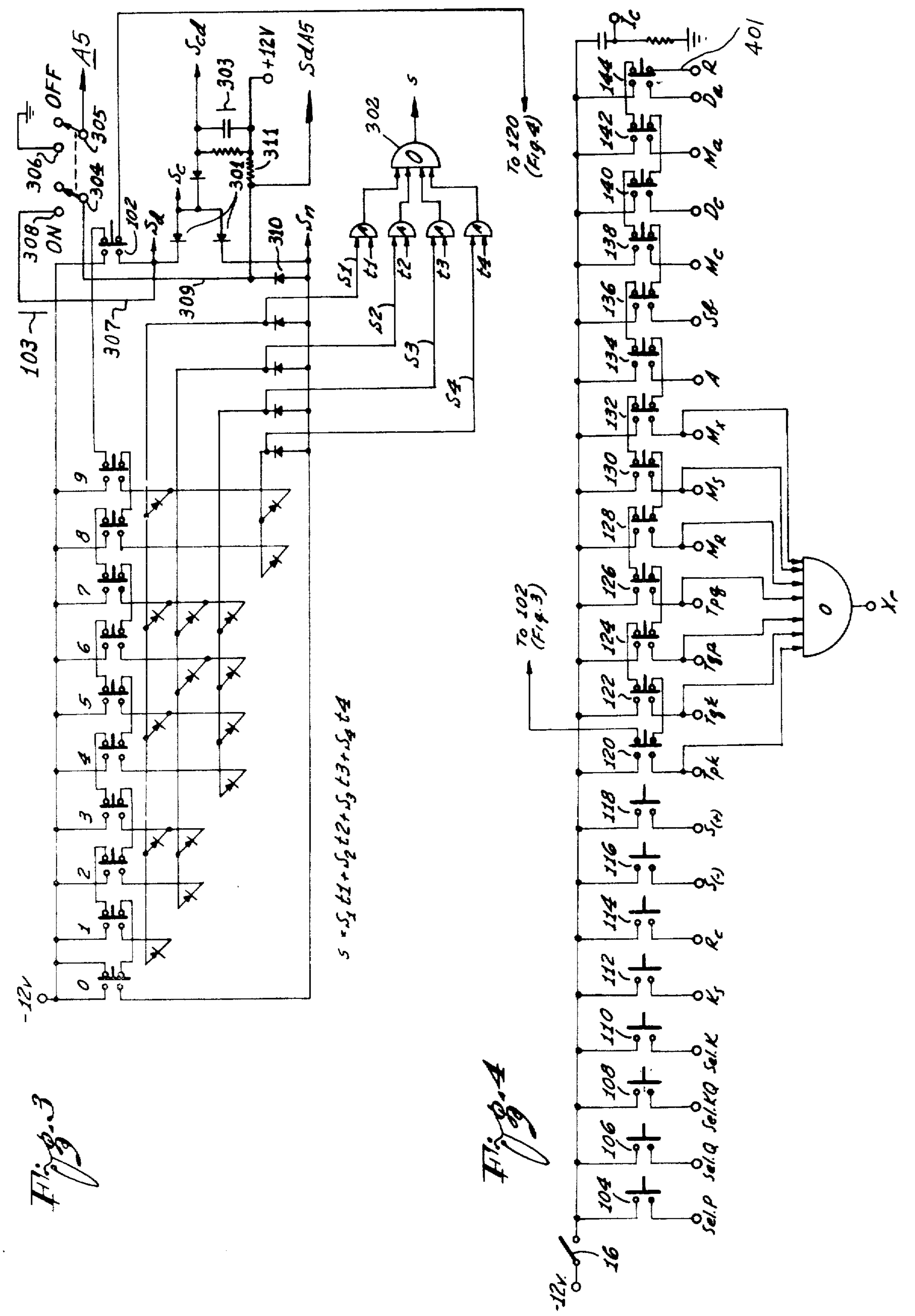
FIG. 3 is a schematic drawing showing the production of signals from the decimal digit and decimal point keys of FIG. 2.
FIG. 4 is a schematic drawing showing the production of signals from the nondecimal keys of FIG. 2.

Sel. K is a key signal produced by depression of key 110 (FIGS. 1, 2 and 4) which serves to select the K register. The key signals Sel. Q, Sel. P, and Sel. KQ are produced by operation of keys 106, 104, and 108. All the above key signals are shown in FIG. 4. Whenever one of these signals is present during Φ00, there will be an output from AND gate 907 (FIG. 9) through OR gate 906 to inverter 908, thus removing one signal previously present on AND gate 909. There can thus be no output from AND gate 909 and as a result (via OR gate 911 and line 912) AND gate 913 will not give a signal when pulsed by the clock T6 on line 914. The input to register 105 will thus be zero.

The above-mentioned key signals also determine the states of the flip-flops *k* and *q* (FIG. 7e)

$$sk=\text{Sel. }K+\text{Sel. }KQ+\ \ldots\ ;\ rk=\text{Sel. }Q+\text{Sel. }P$$

$$sq=\text{Sel. }Q+\text{Sel. }KQ;\ rq=\text{Sel. }K+\text{Sel. }P$$

The flip-flops E1, E2, E3, and E4 (FIG. 9) forming register 105, are used in counting the digits placed in the selected register by use of keyboard 100. Because there are only four of these flip-flops, the number of digits which can be placed in a register is limited to 16. In particular, the P register with a capacity of 24 digits cannot be completely filled from keyboard 100, only the 16 most significant digits of the P register being accessible from this keyboard. The remaining eight digits of the P register can only be affected by arithmetic operations. More flip-flops could be used, of course, if entry into all positions of the larger capacity register were required, but this increases cost.

Consider the process of inserting a number into a register (selected previously) assuming that the number 234.0 remains in the register as the result of a prior operation in the desk calculator. Assume further that the keys operated and the sequence followed are One, Two, Point, Three, Four. The appearance of the display 14 after each operation (the permanent zeros being ignored) is as follows for the cases of normal operation (left) and operation according to the invention (right).

| | Register display | |
|---|---|---|
| | Switch 103 "Off" | Switch 103 "On" |
| Key Operated (prior operation) | 2 3 4.0 0 0 0 0 0 | 2 3 4.0 0 0 0 0 0 |
| 1 | 1.0 0 0 0 0 0 0 0 | 1.0 0 0 0 0 0 0 0 |
| 2 | 1 2.0 0 0 0 0 0 0 | 1 2.0 0 0 0 0 0 0 |
| . | 1 2.0 0 0 0 0 0 0 | 1 2.0 0 0 0 0 0 0 |
| 3 | 1 2.3 0 0 0 0 0 0 | 1 2.0 0 0 0 0 3 0 |
| 4 | 1 2.3 4 0 0 0 0 0 | 1 2.0 0 0 0 0 3 4 |

In the example given at left above, the first key 100 operated is a nonzero decimal digit, therefore the following takes place.

A. The nonzero decimal digit entered is placed in the leftmost digit position of the register and appears in that position (17) on display 14 with the decimal point just to its right, and B. Zeros are set in the remaining 11 digit positions (or 23 positions if P was selected).

With further digit key operations, the additional digits are placed in positions progressively farther right, replacing zeros set there in the above operation. Also, the decimal point is moved successively rightward so that it stands just to the right of the last digit entered. Operation of the decimal point key 102 after one or more significant digits have been set into the register produces no immediately visible effect. Thereafter, however, insertion of additional digits does not result in further rightward motion of the decimal point and the digits enter successive positions. Therefore the effect produced by operation of the decimal point key 102 is merely to fix the decimal point because the five cipher switch 103 is Off.

In the preceding example, the first key operated was a nonzero decimal digit key 100. If, however, the first key operated is the zero key 101, the register is cleared and the decimal point moved one place to the left of its "normal" location. Additional operations of zero key 101 move the decimal point successively farther left (with special action not described here, if there is need for more zeros than are provided by the permanent zeros). If a nonzero digit key 100 is then operated, the digit is placed in the most significant digit position and the decimal point remains fixed in its last previous position (at the left usually). Succeeding digit key operations, whether zero or nonzero, fill positions progressively rightward, with no further change in the decimal point position. The use of the decimal key 102 is also not needed when inserting an integer into a register. As each digit is set in, starting with the most significant digit, the decimal point moves rightward such that when the integer has been completely set in, the decimal point is to the right of the least significant digit.

The foregoing describes the "normal" or "prior art" mode of operation, that which prevails with switch 103 in "Off" position.

In the example given at right in the preceding table, the first key 100 depressed is again a nonzero decimal digit and the results are the same as above described until after the decimal point key 102 is depressed. With the switch 103 in the ON position, depression of the number "3" key of the digit keys 100 following depression of key 102, results in the value 3 being entered into the register (and displayed) at a position five spaces to the right of the position it occupied in the first example, as evident from the simulated display on the right side of the table. Subsequent operation of the number "4" key of the digit keys 100 also results in its entry into the register (and display) at a position displaced by five spaces to the right of the position entered in the first example, i.e., still just one position to the right of that entered by the value 3. If further digits were entered, all would be entered one digit-position to the right of the last digit entered. It will be clear in the following, of course, that the magnitude of the shift is arbitrary and could be made more or less than the value indicated here.

A detailed description of the structure devised for achieving the above-described results is given in the following.

INITIAL ENTRY

The four flip-flops (E1, E2, E3 and E4—FIG. 9) of the register 105 and flip-flop F (FIG. 7*d*) are used in the Enter Digit routine to be described. The E flip-flops operate as a counter to indicate the particular order of the selected register which is to be filled upon the activation of a digit key 100, 101. The state of the E flip-flops indicates the particular digit position to be entered: E=0 indicates the leftmost digit position (17 in FIG. 1, recalling that the half-size zeros are not "genuine" digits), E=1 indicates the second from leftmost, E=2 the next, etc., where E represents the number held in the four E flip-flops (FIG. 9) of register 105. The major distinction to be made is between E=0 (all E flip-flops in the false state) and the other 15 conditions, E 0 (at least one E flip-flop in the true state). The signal E=0 indicates that no significant digits have been set into the selected register, although some zeros following the decimal point may have been set into the register. The signal E 0 indicates that one or more significant digits have been set into the register. The positive number represented by the four bits of the flip-flops E1 to E4 is equal to the number of significant digits which have been placed in the register.

Flip-flop Facts As An Indicator of Decimal Fixation.

The condition F=0 shows that the position of the decimal point has not been indicated in the entry process. If, after selection of a register of completion of an arithmetic operation, the zero key 101 is operated next, then the decimal point is moved one place leftward from its normal position. At the same time, operation of zero key 101 sets flip-flop F (FIG. 7*d*) "On" to show the departure from the virgin condition, E=F=0. Operation of Zero key 101 does not change the settings of flip-flops E1 to E4 of register 105 (FIG. 9) since the leftmost digit position of the storage register is still available for receipt of the digit next presented. Although choice of a decimal position has thus been indicated by setting flip-flop F "On," the decimal point is not irrevocably fixed. Further operations of the zero key 101 shift the decimal point display farther left, and operation of the decimal key 102 after subsequent entry of one or more significant digits will move the decimal point to the right of the last significant digit entered—provided the five-cipher switch 103 is off. If the five-cipher switch 103 is ON, the point does not move upon such depression of decimal point key 102.

The signal E=0 (that is, all bits held in flip-flops E1—E4 of register 105 are zeros) indicates that no significant digits have been entered. Initial zeros are not "significant" digits. The first nonzero digit entered in a register is a "significant" digit and so are all subsequent digits, including later zeros. If a key 100 representing a nonzero digit is operated after selection of a register or after an arithmetic operation, the nonzero digit is placed in the leftmost digit position of the register (position 17 in display 14) and the number in the E register 105 is increased to 1. The decimal point is also moved one place to the right. Operating another digit key 100 or the zero key 101 sets another value in the selected register, again moves the decimal point rightward, and causes the content of E register 105 to again be increased by one. If the decimal key 102 is then operated, flip-flop F (FIG. 7*d*) is set "on." The effect of setting flip-flop F on is to prevent further automatic rightward motion of the decimal point as further digits are inserted in the register. The fixing of the decimal point, however, is not irrevocable when the five-cipher switch 103 is off. If, after additional digits have been inserted, the decimal key 102 is operated a second time under the condition just mentioned, the decimal point will be moved to a position just to the right of the digit last inserted. If the decimal key 102 is operated with the five-cipher switch 103 in the on position, not only is the F flip-flop set "on," but also the count in E register 105 is increased by five (provided E 0) so that the next digit entered will be placed six spaces to the right of the decimal point.

The initial entry into a selected register takes place following operation of any digit key 100 or decimal key 102 if the initial entry conditions E = F = 0 prevail. The initial entry clears the selected register and enters the value corresponding to the first key instruction. The clearance consists of replacing all the digits by zero with the possible exception of the C11 digit in the most significant position of the selected register. The digit in this position will be replaced by the first digit entered (including zero). Further, as a result of initial entry, the previous decimal character in the selected register is changed to correspond with the first entry.

Only one Initial Entry as described above takes place in the course of setting a number into a register. The Initial Entry is performed in the rest state as an effect of the common switch signal $S_c$ shown in FIG. 3 and includes setting the decimal character to the normal value 63. The common switch signal $S_c$ indicates operation of any digit key (separately indicated by the signal $S_n$) or the decimal key (separately indicated by the signal $S_d$) as illustrated in FIG. 3 (the pair of diodes 301 forming a well known OR Gate).

The clearance and decimal character setting are described (FIG. 9) by $$d'=d11(\ldots+C13-14)+\ldots$$

$$d11=\phi 00(\underline{KP}q+K\underline{P}k+P\underline{kg})S_c\underline{F}\ \underline{E}1\underline{E}2\underline{E}3\underline{E}4+\ldots$$

The actual clearance is obtained by connecting the *d*11 output to an OR gate 903 via line 902. The presence of the inverter 904 on the output of OR gate 903 assures that there will be no output on line *d'*, the input to buffer register 109, except at time C13—14 when all "ones" are entered into the decimal character position (the 14 and 15 orders) of the selected register. Control according to that selection is determined by timing signals on line 915 which permit AND gate 916 to open only at appropriate times. The signals on line 915 are formed according to the second term in the equation defining *d*11 above, that term representing a well known combination of three AND gates feeding an OR gate (not shown, therefore). From the previous explanation of the signals defining character periods and the register selection indication in FIG. 7*e*, it will be clear that depression of the Q register selection key 106—for example—will set the *q* flip-flop and reset the *k* flip-flop FIG. (7*e*) and with *q* true there will be a signal on line 915 (FIG. 9) during each character period $\underline{\text{kp}}$ i.e., during each character period defining a position of the *q* register, as explained previously.

The common switch signal $S_c$ is delayed in a passive network 304 as shown in FIG. 3 to provide the signal denoted $S_{cd}$. The signal $S_{cd}$ permits entry to the first phase (Φ04) of the Enter Digit routine by setting the X flip-flop (FIG. 7*b*) if a digit key 100, 101 is operated. The delayed signal $S_{cd}$ also permits setting of the F flip-flop (FIG. 7*d*) if decimal key 102 is operated, as described later. Setting of the X flip-flop occurs after a delay of at least one full memory cycle to permit clearance of the selected register. The setting of this flip-flop is described by $$sX = a0yzS_{cd}S_nKPC12\,t1+ + \ldots \text{ (Fig. 7b)} (\phi 00 \rightarrow \phi 04)$$

The first two terms in the above equation, *a*0 and $\underline{yz}$ define the phase Φ00, the signal *a*0 relating to the condition $\underline{uvw}$ and the signal $\underline{yz}$ being sufficient to identify the zero condition of the second group insofar as the setting of the X flip-flop itself is concerned.

The terms $S_{cd}$ and $S_n$ having already been described above, the only remaining term is the timing signal KPC12*t*1+. This signal identifies the 13 storage position (sign) of the P register and the *t*1+ part indicates that the change occurs after the first half of the first bit period, i.e., during the third and fourth quadrants of that bit period.

ENTER DIGIT ROUTINE

Figure 6:
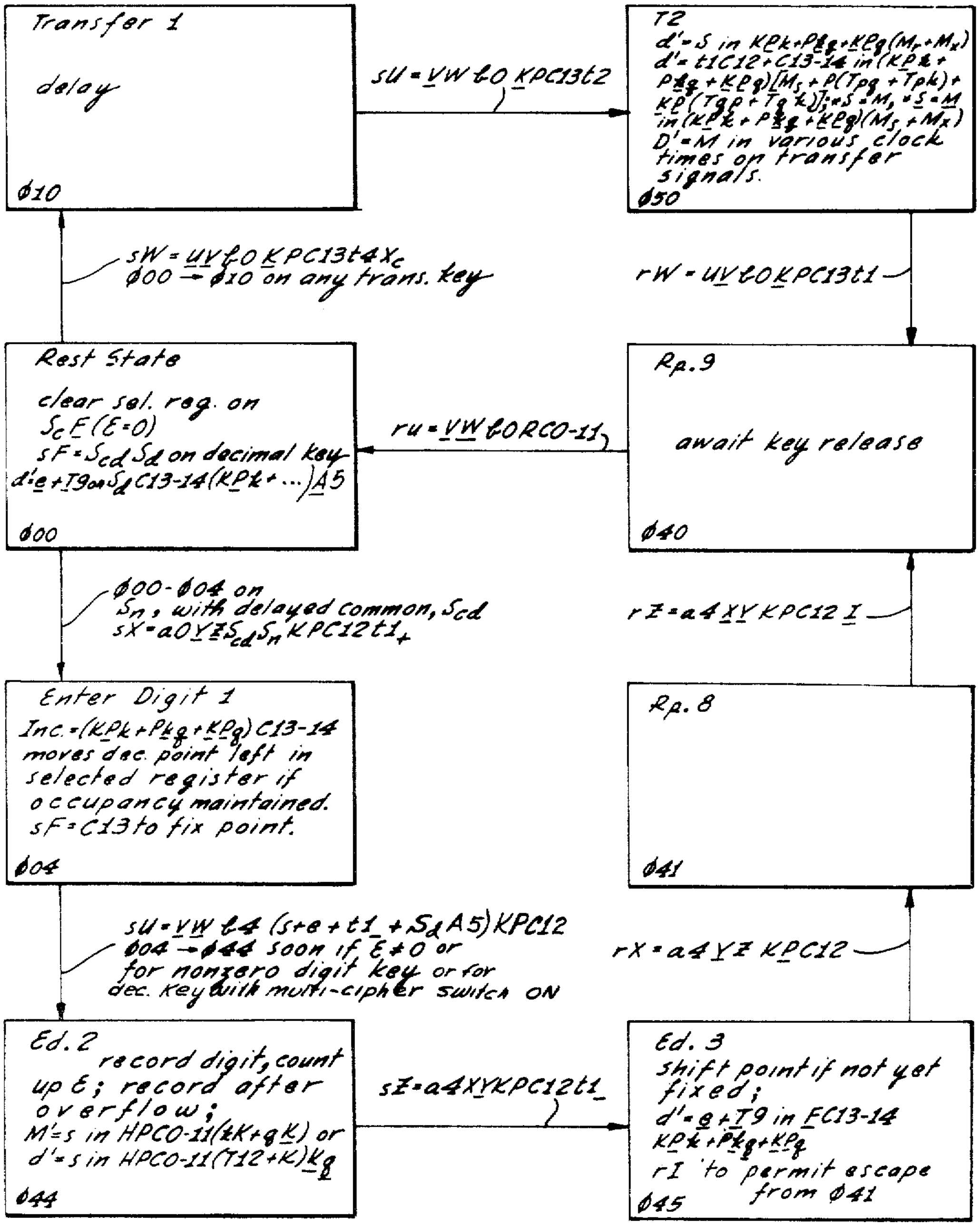
FIG. 6 is a flow chart of the Enter Digit routine.

The Enter Digit routine as shown in FIG. 6 has two active phases, Φ04 and Φ44, the latter being the phase in which values are entered in memory. Approximately one full machine cycle is spent in these two phases together, namely from the time KPC12 *t*1+, when Φ04 is entered as a result of depression of a digit key 100, 101, or the decimal key 102 when switch 103 is on (i.e., signal $S_n$+$S_d$ A5 is present) until the following time KPC12*t*1−, when departure from Φ44 takes place. Most of the machine cycle is spent in Φ44 when a key is operated which enters a nonzero digit or a significant zero into the register (significant zeros are those entered after entry of a nonzero digit). When a nonsignificant zero is entered, most of the machine cycle is spent in Φ04, only a fraction of a bit period being spent in Φ44, since the zero is not recorded.

In Φ44, the recording of each digit is accompanied by an increase in the number held in the flip-flops E1, E2, E3 and E4 (FIG. 9) of register 105. Therefore, the number held in the four E flip-flops at the start of an enter digit routine always provides a count of the digits already recorded. If the number held in the four E flip-flops differs from zero, then one or more digits have been recorded and at least one of these digits is other than zero. In such case (E 0), Φ44 is entered promptly from Φ04, so as to record the newly presented digit, whether it is a zero or not. If, however, E=0 at the time of entry to Φ04, and a nonzero digit key 100 was depressed, prompt entry to Φ44 is produced with consequent recording, whereas if zero key 101 was depressed, recording is not necessary and departure from Φ04 does not occur until substantially the end of the cycle.

Entry to Φ44 is then as follows. The four bits S1, S2, S3 and S4 representing a digit corresponding the key being operated are presented in succession as a signal *s* as shown in FIG. 3. Depressing a digit key thus provides a direct binary coded decimal digit signal in each character period in which the key contact is closed. Furthermore, the four bits of the E flip-flops are presented as the signal *e*. If either signal *s* or *e* presents a one-bit, Φ44 is entered promptly and the recording performed, as will be described. Entry to Φ44 from Φ04 occurs within the character period KPC12. The entry is shown in (FIG. 7*a*) by $$sU = \underline{v}wb4KPC12(s+e+t1+S_dA5) + \ldots (\phi 04 \rightarrow \phi 44)$$

The first item in the above equation, $\overline{vw}$ identifies the phase Φ04, the signal $\overline{vw}$ being sufficient to identify the zero condition of the first group of sequence flip-flops insofar as the setting of the U flip-flop is concerned, and the signal *b*4 relating to the condition $X\underline{yz}$ which exists after passage from Φ00 to Φ04 upon setting of the X flip-flop. The second term KPC12 is the P register sign character period, as already explained above in connection with setting of the X flip-flop. The third term provides for entry to Φ44 if the key depressed was a nonzero key 100, or the second (or later) key following the first nonzero key, or if the time *t*1− has arrived during a character period identified as above (implying that almost a complete machine cycle has occurred) or if the decimal key 102 is operated with switch 103 on. This last causes "recording" of a zero in the most significant digit position, and permits entry of the next digit in a position five spaces to the right of the one otherwise entered. If signal $S_d$ A5 is not present, and no one-bit occurs in either signal *s* or *e* for the remainder of the character period KPC12, then occupancy of Φ04 is continued for nearly a full machine cycle. If Φ04 is occupied as just described, an incrementation of the decimal character of the selected register is performed to note this event, even though the zero was not "recorded." In this latter case, entry to Φ44 also occurs, but is only momentary and is delayed until the time KPC12*t*1−, almost a full machine cycle later. The incrementation is described (FIG. 9) by $$Inc. = \phi 04C13-14(K\underline{P}k + P\underline{kq} + \underline{KP}q) + \ldots$$

In the above equation, the term Φ04 limits effectiveness of the signal to that phase, the term C13—14 limits it to the decimal character periods (14 and 15 storage positions) and the term in parenthesis limits it to the position of the selected register only. The element KPk (obtainable, for example, with a three input AND gate, the output of which is then one of three inputs to an OR gate providing an output representative of the term in parentheses) assures that in case of selection of the K register, there will be no entries to the Q or P registers. The other elements of this term are similarly obtained and similarly limit the incrementation to the register selected.

Departure from Φ44 occurs at the time KPC12*t*1−, with a subsequent entry to Φ40 to await the release signal R on line 401 (FIG. 4) to permit return to the rest state Φ00, entry to Φ40 from Φ44 being via Φ45 and Φ41 as described later.

Recapitulating, if E=0 and the zero key 101 is depressed, Φ04 is entered at the time KPC12*t*1+ and is occupied for very nearly a full machine cycle from KPC12*t*1+ to KPC12*t*1− in the following cycle and subsequent occupancy of Φ44 is only for a fraction of a bit period. In any other situation, operation of a digit key 100, 101 is followed by occupancy of Φ04 for some part of character period KPC12 only and then Φ44 occupied for the remainder of the time until the next KPC12*t*1−.

When a digit is to be recorded during the occupancy of Φ44, the digit presented by the signal *s* is set into the appropriate digit position of the selected register, K, Q, P, or K and Q. Selection of the appropriate digit position is made by incrementing the E flip-flop content by one in each of the character periods PCO–11 together with other correcting incrementations. The selected character period is that one which follows advance of the E flip-flops from 15 to 0. Flip-flop H (FIG. 8) is used in the incrementation process and remains on in the character period, one of those designated P CO–11, in which the recording is done.

Except in the case $\overline{kq}$ (the selected register then being P), a correcting increment of amount four is made in each of the character periods $\overline{P}$C14 to compensate for the fact that only twelve digit positions need be counted. Therefore, the total increase in the E flip-flop content in each half-cycle is by the amount 16, which is just sufficient to restore the E flip-flops to their initial value. A further incrementation of one is made in the character period KPC12, immediately before departure from Φ44. The E flip-flop content will therefore have been advanced by one as a result of the cycle of occupancy of Φ44, and accordingly the next operation of a digit key 100, 101 will place a digit in the next earlier or less significant digit position. If the P register is selected ( $\overline{kq}$ then being true), the two correcting increments of amount four in $\overline{P}$C14 are replaced by a single correction of amount eight at the time $\overline{K}$PC14. The E flip-flops then count up continuously through the series of 24 digit positions of the P register. The counting in the E flip-flops is normally described as follows:

$$e' = (e \neq H)/\phi 44\ \underline{P}/S_n + \ldots \quad \text{(Fig. 9)}$$

$$sH=\phi 44\ \underline{P}[(CO-11+KC12)t1+C14\ (k+q)\ t3 + KC14\ \underline{kq}\ t4)]+\ .\ .\ .\quad \text{(Fig. 8)}$$

$$\underline{H}^{*}=\phi 44\ \underline{P}\ \underline{e}+\phi 44\ P\ t4+\phi 04+\ .\ .\ .\quad \text{(Fig. 8)}$$

The terms in the above equations are as follows. In the first equation, which defines the circumstances for changing the settings of E register 105, the first term e H is the output of an OR gate 917 representing the "Exclusive Or" logical combination of e and H. This output causes the changing of the state of the flip-flops E1 to E4 of register 105 only when there is no agreement with the state of flip-flop H and, of course, only during the P' time of a character period pair identified by the same C-number when the machine is in Φ44 of an enter digit routine initiated by depression of a digit key 100 or 101 (the signal $S_n$ therefore being present). This is evident from connection of the output of OR gate 917 to an AND gate 918 having as a controlling input the output of AND gate 919. This latter AND gate differs from a similar AND gate present in the copending application, because it is a three-input gate rather than a two-input gate. The third input is the signal $S_n$ (FIG. 3), which limits the order-by-order counting of E-register 105 to those cases where a digit key 100 or 101 was depressed, for reasons explained subsequently.

In the second equation, the first term in the first parentheses within the brackets sets the H flip-flop at the start of each of the P digit character periods. Together with the first term of the third equation, which shows that the H flip-flop is reset at the end of any bit period in which the output of the E register 105 was a zero (the timing of the resetting is indicated by the asterisk, as previously explained), this term controls the unit incrementation of E register 105 for each digit position of the selected register. Thus, a "One" added during the P time of a character period pair is "carried" until a "0" is found in the E-register 105. Only when register 105 contains all ones is the carry propagated into the succeeding (P) time of the character period pair. When such a carry occurs, the recording is performed, as will be described subsequently. Implementation of these terms is shown in FIG. 8 where the setting of H according to the first term of the second equation is accomplished by means of serial interconnection of OR gate 802, AND gate 803, OR gate 804, AND gate 85, and OR gate 806 to the set side of flip-flop H. Resetting of flip-flop H to end the "carry" when a zero bit is found in register 105, as required by the first term of the third equation given above, is implemented by AND gate 801, together with OR gate 807 at the left. The output of OR gate 807 goes to the reset terminal of the H flip-flop which is marked with an asterisk. As stated previously, the resetting is then synchronized with the end of a bit period by a clock signal which is not shown (such timing of flip-flop changes of state is well known, an example being given in the copending application).

The second term in the first parentheses within the brackets of the second equation, a term which raises the count in the E register by one for each digit entry, is implemented through the same chain of gates as the first term, since it forms a second input to OR gate 802. Similarly, the remaining two terms of this equation are also implemented through part of this same chain of gates, AND gates 808 and 809 forming additional inputs to OR gate etc., These latter two terms provide for addition of corrective counts to register 105 to ensure that the register counts only the 12 positions of registers K and the Q and 24 positions of register P. Note that these corrections are made just before the digit positions are "scanned" such that with the Q register selected, for instance, and zero content of register 105 (no previous entry of a significant digit) the count in register 105 will be at 4 prior to the first digit position, set to 5 during the first digit position, etc. and set from 15 (all ones) to zero during the 12 digit position, such that the H flip-flop will still be on during the second half of the 12 character period pair, marked P. This allows recording of the new information at the proper time, as will be described.

In the third equation, the remaining two terms, implemented by AND gate 810 and another input 811 to OR gate 807, were not present in the copending application and have been introduced to avoid incrementing register 105 when an incrementation is not in order. As these changes are only incidental to multicipher entry, they will not be discussed further herein.

In summary, during the one machine cycle of Φ44, these equations increment E register 105 by one in each P CO–11 character period, by one before leaving Φ44, by four in both K P C14 and KPC14 when either K or Q are selected, and by eight in KPC14 when P is selected.

On the other hand, if the decimal key 102 is operated with the five-cipher switch 103 in the on position (FIG. 3) after one or more significant digits have been entered (i.e. E 0), the count in E register 105 (FIG. 9) at the end of Φ44 has to be five units greater than the count when Φ44 was entered. This is accomplished by incrementing E by four in KPC12 *t3* on the signal SdA5 (FIG. 3), where A5 is a level which is true only when the five-cipher switch 103 is in the on position. The usual further one-digit incrementation of E, described in the preceding paragraph, again takes place immediately before departure from Φ44. This brings to five the net increase in E register 105.

With switch 103 taken into account then, the counting in the E register 105 is modified as follows; the other equations being unchanged:

$$sH=\phi 44\ \underline{P}[(CO-11+KC12)t1+\underline{K}C12t3\ S_{d}A5 +C14\ (k+q)t3+KC14\ \underline{kq}\ t4]$$

The second term within the brackets in the equation for setting H has been added to increment E register 105 by four when the decimal key is operated with the five-cipher switch 103 on. The SdA5 part of this term is implemented, as shown in FIG. 3, by connecting the $S_d$ output line of decimal point switch 102 via line 307 to one terminal 308 of one pole 304 of switch 103, a double-pole, double-throw switch. Pole 304 is connected by line 309 to the cathode of a diode 310 having its anode connected to the $S_n$ signal line. Line 309 is also connected to a source of positive voltage through a resistance 311. Thus, with the switch 103 operated—i.e. in the position opposite to that shown in FIG. 3, the signal lines SdA5 and $S_n$ will be connected to switch 102 such that the level on these lines will be positive (false) when decimal point switch 102 is standing unoperated, and negative (true) when switch 102 is closed by depression of the associated key. With switch 103 in the off position, the level on line SdA5 is always positive (false), regardless of the state of switch 102, and regardless—in view of the presence of isolating diode 310 of the level on line $S_n$, which may become negative (true) if one of the keys 100 or 101 is depressed.

Recording in the K and Q registers is performed by replacing the signal *d*, the normal input to the memory (output of register 109), with the signal *s* in a PCO-11 character period in which H=1. The condition H=1 indicates that there was an overflow in the counting-up of the E flip-flops. The recording is described by $$M'=\phi 44\ H\ PCO-11\ (kK+q\ \underline{K})\ s+\ .\ .\ .$$

The above equation is implemented by the output of AND gate 1006 in FIG. 10. One of the two inputs to gate 1006 is the binary coded decimal output *s* of OR gate 302 (FIG. 3). The other input to gate 1006 comes from another two input AND gate 1005, combining the remaining terms of this equation. The register definition term (*k*K + *q*K) is obtained as the output of OR gate 1002, with K register selection through AND gate 1003 and Q register selection through AND gate 1004. The terms defining the phase, overflow condition, and digit character positions are combined in AND gate 1001. Because normal circulation of information in the slow-speed memory involves reentry of the single character from buffer register 109 (FIG. 9), note that such circulation must be suppressed during entry of the keyboard data. Accordingly, the output from AND gate 1005 is connected by a line 1011 to an OR gate 1009 and through an inverter 1008 to a two-input AND gate 1007 having *d*, the output of buffer register 109, as its input. Inverter 1008 assures that AND gate 1007 will be blocked when the signal on line 1011 is true. Similarly, the normal high-speed recirculation through AND gate 1015 and OR gate 1016 must be blocked at the time, designated N127 for reasons not essential to this description, when the bits of the new digit are being entered into the delay line through AND gate 1012 and OR gate 1016. For this purpose the time signal N127 is also connected to AND gate 1015 via line 1017, OR gate 1013, and an Inverter 1014, which last assures that AND gate 1015 will likewise be blocked when the bits of the new digit are being entered through AND gate 1012.

On the other hand, entry into the P register is performed by replacing the signal M, the normal input to the D flip-flops of buffer register 109, with the signal *s*. No entry may be made in any of the first eight digits of the P register since these would be erroneous duplications of entries intended for the most significant eight digits. Because the first eight of the twelve pairs of character periods, CO–11, are marked T12, whereas the remaining four are marked T12, entry to the $\overline{P}$ register is only permitted at the times (T12 + K) which correspond to the last four digits appearing in the first half cycle and all the digits appearing in the second half cycle. The entry is described by $$d'=\phi 44\ H\ PCO\text{–}11\ (T12+K)\ \underline{k}\ \underline{q}\ s$$

The foregoing equation is implemented (FIG. 9) by AND gate 927 having *s*, the output of OR gate 302 (FIG. 3), as one input and the output of AND gate 928 as another input. The terms controlling the recording in the P register are similar to those for recording in the other two registers except for the provision of the term T12 in (T12 + K) which permits recording in the four highest digit positions of the less significant half of the P register. The (T12 + K) term is implemented by OR gate 929 as one input to AND gate 928. Further, connection of AND gate 928 and to AND gate 931 via line 930, OR gate 903, and Inverter 904, assures that the normal flow of bits from flip-flop M (111 in FIG. 5) to buffer register 109 is blocked during entry of the keyboard data.

The reason for the difference in the independent variable of the equation for recording K or Q as against that for recording in P lies in the fact that since the common term PCO-11 restricts recording to P times and the positions of the K or Q registers precede the corresponding P register positions, entry to the former registers' positions must occur one character period earlier in time. This is achieved through bypassing the normal one character period delay afforded by the buffer register 109 (compare FIGS. 9 and 10).

Departure from Φ44 with entry to Φ00 via Φ45, Φ41 and Φ40 will be described briefly below. From Φ40, the system returns to the rest state Φ00.

DECIMAL POINT FIXATION

If the zero key 101 is operated when E=0, entry to Φ44 is delayed for almost a full machine cycle as previously described. Also, Φ04 rather than Φ44 is occupied for almost a full machine cycle and the decimal character of the selected register is increased as described previously. Another consequence of the occupancy of Φ04 after the character period KPC12 is the setting of the F flip-flop to fix the decimal point. The fixation of the decimal point prevents clearance of the register, including return of the decimal point to the standard position, on operation of the next digit key 100, 101. Another way in which the decimal point is fixed is by operating decimal point key 102. Setting of flip-flop F by zero-key 101 or decimal point key 102 is described (AND gates 705 and 709, FIG. 7*d*) by $$sF=\phi 00\ S_{cd}\ S_d+\phi 04\ C13+$$

The signal from the decimal key 102 ($s_d$ in FIG. 3), in addition to being used to indicate fixation of the decimal point, is also used to initiate copying of the complement of the content of the E register, into the first character position of the decimal point indication and one bits into the second character position of the decimal point indication of the selected register. This is described (FIG. 9) by $$d'=d12\ (\underline{e}+\underline{T}9)+\ .\ .\ .$$

where $$d12=\phi 00\ S_d\ C13\text{–}14\ (\underline{K}Pk+\underline{P}kq\underline{+KP})\underline{\ }A5+\ .\ .\ .$$

The input d′ to buffer register 109 is implemented in this instance by providing OR gate 920 with a two-input AND gate 921 as one input. AND gate 921 combines the two terms of d′. In the equation for the term *d*12, the literal $\underline{A}5$ assures that input to register 109 will be effective only when switch 103 is in the off position. This is realized by connecting the output of AND gate 926 to one pole 305 of switch 103 and having the on terminal 306 (corresponding to pole 305) connected to ground such that the output of AND gate 926 is clamped "false" when switch 103 is in the on position. Term ($\underline{e}+\underline{T}9$) OR gate 922 provides for entering the complement of the contents of the E register 105 in the first decimal character position (C13) and one bits in the second decimal character position (C14). The d12 term is provided through three-input AND gate 923 with AND gate 926 as an input through OR gate 924. The other inputs to AND gate 923 are the decimal position signal (C13—14) and the register selection signal on line 915. The decimal point is therefore placed at the extreme left "genuine" display position 17 of the register if E=0 (the complement of 0 being all ones, i.e. 63), and placed to the right of the last digit inserted if E 0.

A similar copying of $\underline{e}$ into the decimal character position of the selected register takes place after departure from Φ44 under the condition $\underline{F}$. The condition $\underline{F}$ is true if the position of the decimal point has not yet been fixed. Phase Φ45 is used to record the decimal character and is entered at the time KPC12 *t*1– as described (AND gate 708, FIG. 7*c*) by $$sZ=a4\ X\underline{Y}\ KPC12\ t1\underline{\ }+\ .\ .\ .\qquad (\phi 44\rightarrow\phi 45)$$

Recording of the decimal character is shown (FIG. 9) by $$d'=d12\ (\underline{e}+\underline{T}9)+\ .\ .\ .\ ;$$

where $$d12=\phi 45\ \underline{F}\ C13\text{–}14\ (K\underline{P}k+P\underline{kq}+\underline{KP}q)+\ .\ .$$

The equation for the copying of $\underline{e}$ into the selected register's decimal character position is implemented by using the same chain of gates (920, 921 and 923) and providing two-input AND gate 925 as a second input to OR gate 924, previously mentioned as supplying one input to AND gate 923.

Phase Φ41 is entered after about one machine cycle in Φ45. Escape from Φ45 is described (AND gate 710, FIG. 7*b*) by $$rX=a4\underline{Y}Z\ \underline{K}PC12+\ .\ .\ .\qquad (\phi 45\rightarrow\phi 41)$$

The timing terms in the above equation have been described previously. Departure from Φ41 occurs immediately after entry (for reasons described in the copending application). Phase Φ40 is then entered with a subsequent return to the rest state after the appearance of the release signal, R, on line 401 of FIG. 4. The release signal R is obtained on line 401, which serially connects the normally closed contacts of the operation keys 120—144. Signal R is therefore present when none of these keys is being held depressed by the operator. Absence of the R signal indicates that Φ00 is not to be entered because the operator is slow in releasing the key (introducing possibility of a renewed entry cycle). Since Φ45 is occupied after phase Φ44, the number held in the E flip-flops (FIG. 9) during Φ45 is the number of significant digits thus far entered in the selected register. The number set into the decimal indication positions during Φ45 is 62 after one nonzero digit has been entered, 61 after two such digits have been entered, and so on. Therefore as a multidigit integer is set into a register by depressing keys indicating successive digits starting from the most significant to the least significant ones of the integer, the decimal point in display 14 appears to the right of the digit last entered until the decimal key 102 is operated, after which the automatic rightward progression of the decimal point as digits are inserted no longer occurs. Further details of the decimal point display controls being given in the copending application, and being ancillary to digit entry, they will be omitted here.

From the foregoing description and with reference to the drawings, it is believed that my invention is sufficiently clear and that further details would be superfluous. It is also evident that changes in specific form (other memory devices, other codes, etc. could be made without departing from the spirit or essential characteristics of the invention. The present embodiment is therefore to be considered illustrative rather than restrictive, the scope of the invention being defined in the accompanying claims.

I claim:

1. In a device for entering data into a memory having at least one register with a plurality of digit positions, said data entering device comprising a keyboard having a plurality of value entry keys, and means responsive to depression of a first one of said value entry keys for entering a corresponding value into one of said positions of said register and responsive upon subsequent depression of any one of said value entry keys for entering the corresponding value into an adjacent one of said positions, the improvement comprising:

A. a special key on said keyboard;

B. conditioning means, settable to a discrete state; and c. said data entering means being operative in response to depression of said special key when said conditioning means is in said discrete state, to cause a next depression of one of said value entry keys to enter the corresponding value into a position shifted by a plurality of positions with respect to said adjacent position.

2. A data entry device as defined in claim 1, wherein said conditioning means is a switch settable to first and second positions, said discrete state corresponding to said second switch position.

3. A data entry device as defined in claim 1, wherein depression of the special key determines the location of a radix point in said plurality of digit positions.

4. A data entry device as defined in claim 3, wherein the value keys enter decimal digits into said register and the special key is a decimal point key.

5. A data entry device as defined in claim 1, wherein each register position is identifiable by a discrete address, and said value entering means include address means set to successive addresses upon each depression of any of said value keys, and set to an address differing by a value N from a said successive address upon depression of said special key when said conditioning means is in said discrete state.

6. A data entry device as in claim 5, wherein the value keys enter decimal digits into said register and the location of the decimal point relative to the digits entered in said register is fixed in response to depression of said special key.

7. A data entry device as in claim 1, together with means generating a plurality of timing signals, some of said signals being representative of respective positions in said register, said memory operating in repetitive cycles under control of said timing signal generator; a normally-disabled counter; and means enabling said counter for operation under control of said timing signals and in synchronism with said memory, said counter developing a number of counts equal to the plurality of register positions plus one additional count in response to each depression of any of said value keys and developing said number of counts plus a further count having a value one less than the number of said plurality of shifted positions, in response to depression of said special key when said counter is enabled with said conditioning means in said discrete state.

8. A data entry device as in claim 7, wherein entry of said value into said register occurs when the count on said counter returns to an initial value.

9. A data entry device as in claim 8, wherein said initial value is zero.

10. A data entry device as in claim 7, wherein said cycles each comprise two half-cycles, said memory has three registers, two of said registers each having N digit positions and the other register having 2N digit positions, the digit positions of said other register being interleaved with the digit positions of said two registers, all digit positions of each of said two registers being present in a respective half-cycle of the memory; and said counter has a counting capacity M, in excess of the number N of digit positions in each of said two registers but less than the number 2N of digit positions in said other register; and further including means to select one of said registers for value entry and means conditioned by selection of one of said two registers and responsive to depression of any of said value keys to cause said counter to develop a number of counts equal to N plus a correcting count equal to M-N in each said half-cycle plus one additional count in each full cycle; and means conditioned by selection of said other register and responsive to depression of any of said value keys to cause said counter to develop N counts in each said half-cycle plus a correcting count equal to 2(M-N) in one said half-cycle plus one additional count in each full cycle.

11. In a data entry device having a keyboard, a plural position register, including at least one position for storing decimal point information; digit keys on said keyboard; means for addressing each position of said register; means for controlling the sequence of operations in a first routine incidental to entry of a value into an addressed position of said register in response to operation of any one of said digit keys, including means to set said address means to the address of an adjacent position after entry of said value; the improvement comprising: a decimal point key on said keyboard; a switch on said keyboard, said switch normally being in one of two positions; means responsive to depression of said decimal point key to control the sequence of operations in a second routine incidental to recording decimal point information in said decimal point position of said register; and further responsive, when said switch is in the other of said two positions, to enable said first routine control means for entry of a zero into said addressed position and for setting of said address means to the address of said adjacent position, together with a further setting of said address means to an address N positions away from said adjacent position.